United States Patent
Szentmihalyi et al.

(10) Patent No.: US 8,313,587 B2
(45) Date of Patent: Nov. 20, 2012

(54) METHOD FOR PRODUCING A TORQUE TRANSMISSION DEVICE USEFUL AS A FIXED CONSTANT VELOCITY BALL JOINT FOR DRIVE SHAFTS

(75) Inventors: Volker Szentmihalyi, Gutach (DE); Mathias Lutz, Tuebingen (DE); Ekkehard Koerner, Goeppingen (DE)

(73) Assignee: Neumayer Tekfor Holding GmbH, Hausach (DE)

( * ) Notice: Subject to any disclaimer, the term of this patent is extended or adjusted under 35 U.S.C. 154(b) by 61 days.

(21) Appl. No.: 12/980,699

(22) Filed: Dec. 29, 2010

(65) Prior Publication Data

US 2011/0092300 A1    Apr. 21, 2011

Related U.S. Application Data

(60) Division of application No. 12/348,541, filed on Jan. 5, 2009, now Pat. No. 7,883,424, which is a continuation of application No. PCT/DE2007/001183, filed on Jul. 5, 2007.

(30) Foreign Application Priority Data

| Jul. 5, 2006 | (DE) | 10 2006 031 002 |
| Aug. 12, 2006 | (DE) | 10 2006 037 847 |
| Jul. 3, 2007 | (DE) | 10 2007 030 898 |

(51) Int. Cl.
*C22C 8/00* (2006.01)

(52) U.S. Cl. .......... 148/220; 148/206; 148/225; 29/428

(58) Field of Classification Search .......... 464/145; 148/206, 225, 220; 29/428
See application file for complete search history.

(56) References Cited

U.S. PATENT DOCUMENTS

| 5,501,639 | A | 3/1996 | Krude |
| 6,872,143 | B2 | 3/2005 | Weckerling et al. |
| 6,893,352 | B2 | 5/2005 | Jacob et al. |
| 7,396,284 | B2 | 7/2008 | Jacob et al. |
| 2002/0065138 | A1 | 5/2002 | Johnson et al. |
| 2002/0077186 | A1 | 6/2002 | Hosoya et al. |
| 2002/0119862 | A1 | 8/2002 | Goto et al. |
| 2005/0039825 | A1 | 2/2005 | Schuster |
| 2006/0014587 | A1 | 1/2006 | Jacob |
| 2009/0176586 | A1 | 7/2009 | Szentmihalyi et al. |

FOREIGN PATENT DOCUMENTS

| DE | 199 05 451 A1 | 9/2000 |
| DE | 100 32 853 | 1/2002 |
| DE | 101 59 776 A1 | 6/2003 |
| DE | 102 09 933 | 10/2003 |
| DE | 102 20 715 | 11/2003 |
| DE | 102 37 172 | 4/2004 |
| WO | WO 2006/037355 | 4/2006 |
| WO | WO 2008/003306 | 1/2008 |

OTHER PUBLICATIONS

International Search Report dated Nov. 15, 2007.

*Primary Examiner* — Jessee R. Roe
(74) *Attorney, Agent, or Firm* — Crowell & Moring LLP

(57) ABSTRACT

A method for producing a torque transmission device such as a fixed constant velocity ball joint constructed as an opposed track joint in which the curvatures bases of the tracks of the joint deviate in their axial course from the curvatures of the ball contact lines. The method is characterized in that prior to the formation of a longitudinal profile of a joint component, the component is brought to an increased hardness by a hardening process and a diffusion layer is partially or completely removed in the region of the longitudinal profile.

20 Claims, 7 Drawing Sheets

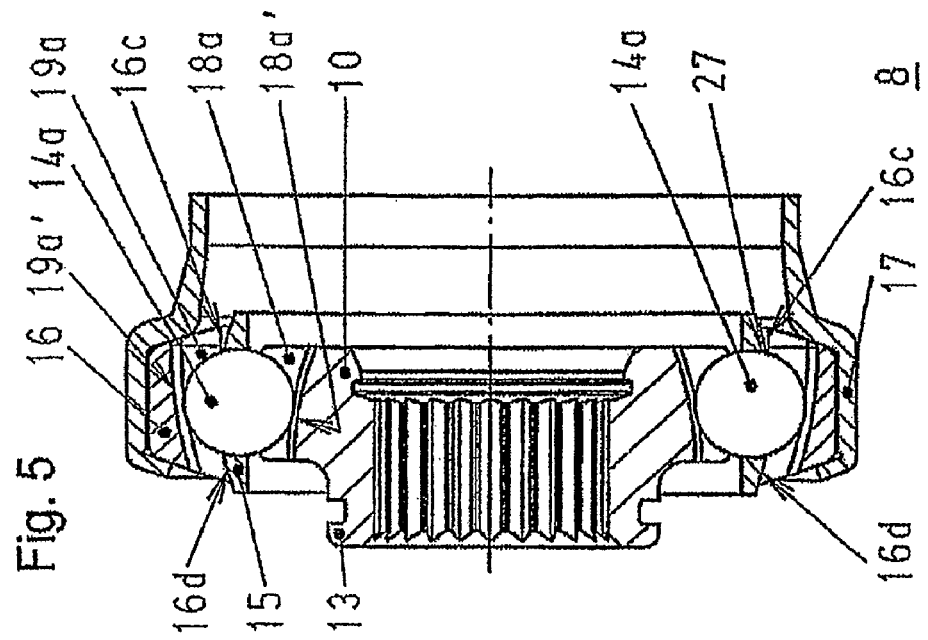
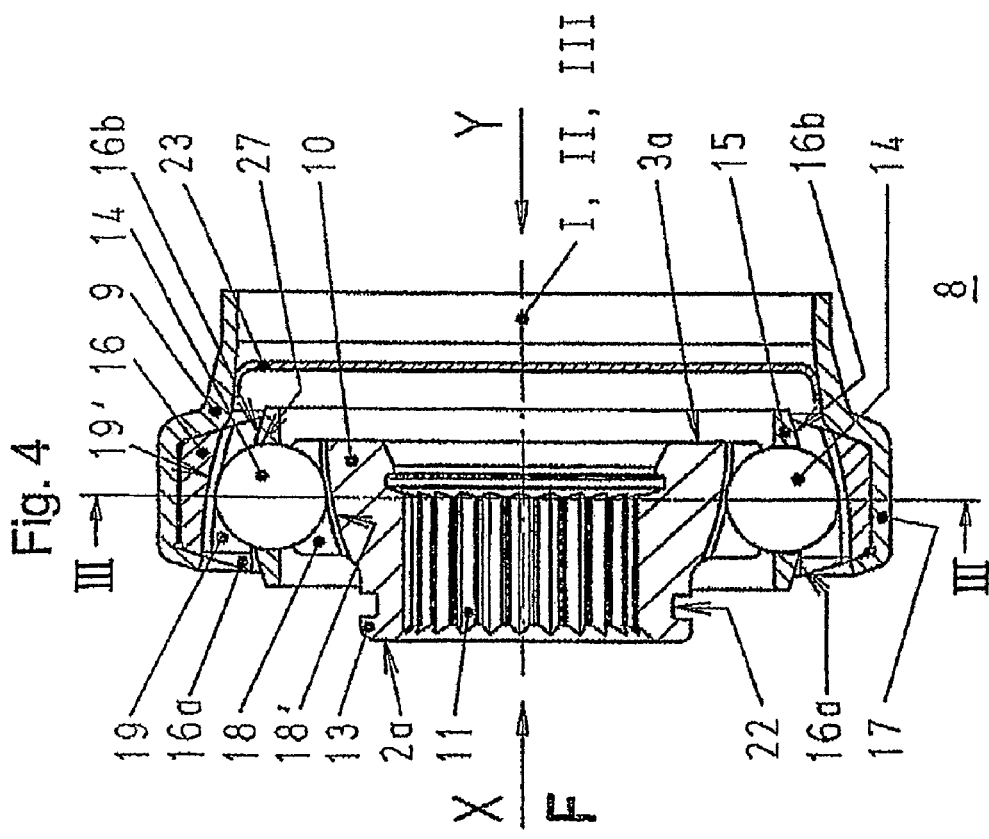

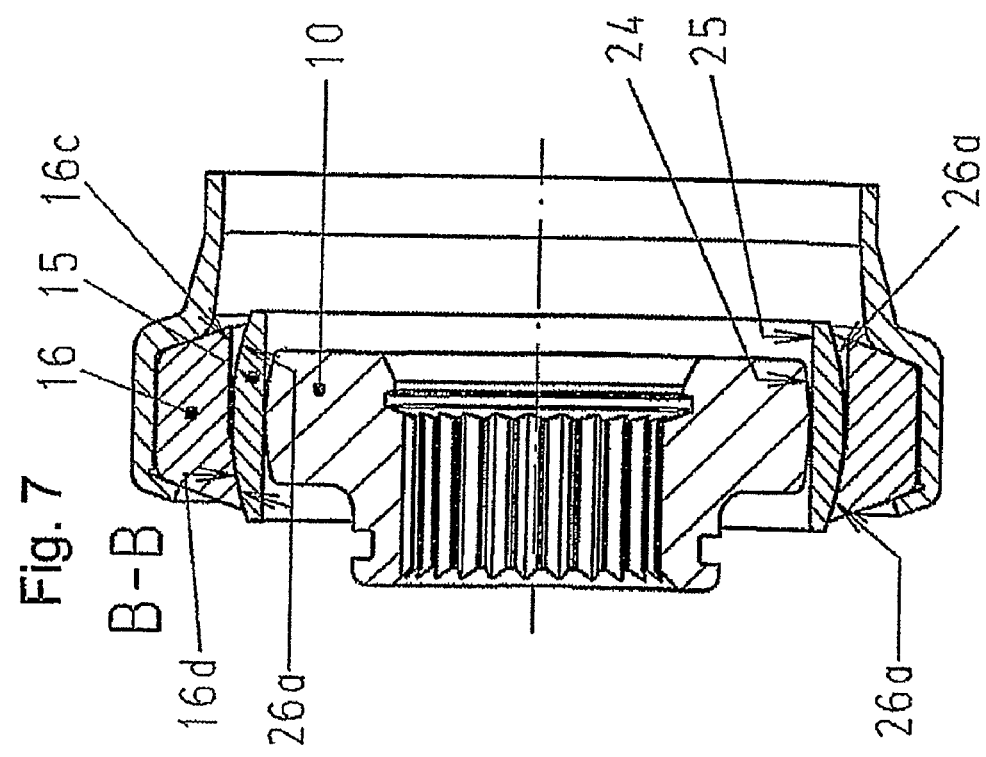
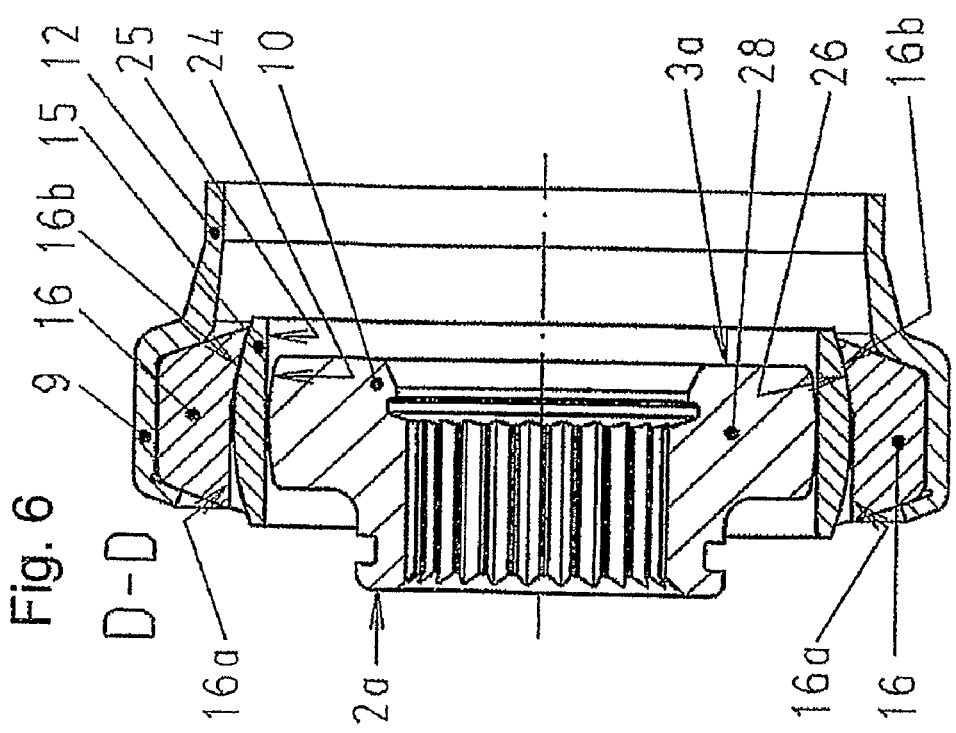

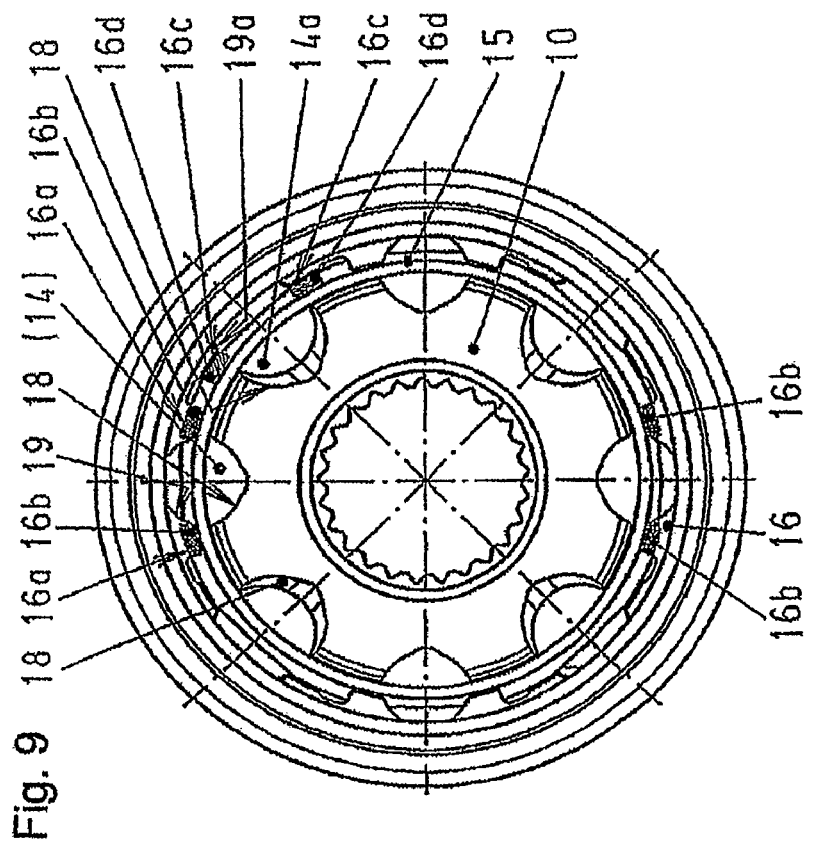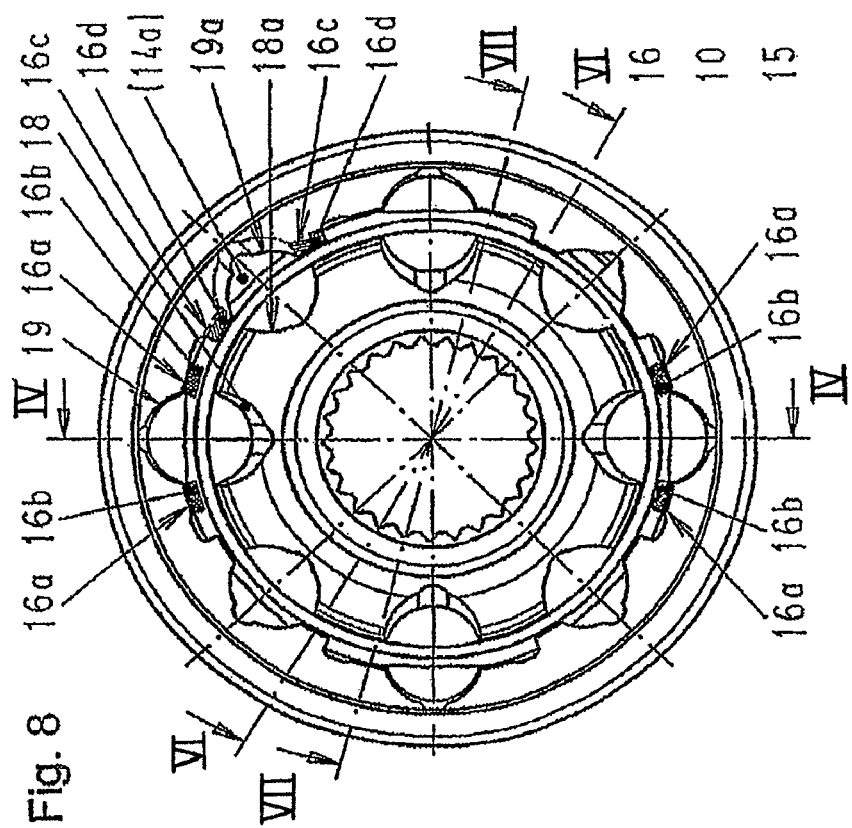

METHOD FOR PRODUCING A TORQUE TRANSMISSION DEVICE USEFUL AS A FIXED CONSTANT VELOCITY BALL JOINT FOR DRIVE SHAFTS

CROSS REFERENCE TO RELATED APPLICATIONS

This application is a division of application Ser. No. 12/348,541, filed Jan. 5, 2009, now U.S. Pat. No. 7,883,424, which in turn was a continuation of international patent application no. PCT/DE2007/001183, filed Jul. 5, 2007 designating the United States of America and published in German on Jan. 10, 2008 as WO 2008/003303, the entire disclosure of which is incorporated herein by reference. Priority is claimed based on Federal Republic of Germany patent application nos. DE 10 2006 031 002, filed Jul. 5, 2006; DE 10 2006 037 847, filed Aug. 12, 2006 and 10 2007 030 898, filed Jul. 3, 2007.

BACKGROUND OF THE INVENTION

The invention relates to a torque transmission unit having at least one component for transmitting torques via each of two functional areas formed onto the component and causing the torque flow by a formfitting engagement with other elements, at least one of the two functional areas being constructed as a profile, such as longitudinal teeth.

Torque transmission units of this type are disclosed, for example, in U.S. Pat. No. 6,872,143 (=DE 102 20 715) in connection with side shafts and in US 2006/0014587 (=DE 102 37 172) in connection with longitudinal shafts.

In U.S. Pat. No. 6,872,143, two such components are provided for each of the fixed, constant velocity ball joints provided on both ends of the side shaft, on each of which different functional areas formed onto the particular component are provided, which cause the torque flow by formfitting engagement and one of which is constructed as longitudinal teeth.

One component is the joint external part, whose one functional area causing the torque flow by formfitting engagement is a connection pin having formed-on longitudinal teeth, which is provided on the joint external part, and whose other functional area transmitting the torque are the raceways in the joint external part for the balls of the joint.

The second component also having two functional areas for transmitting torque is the joint internal part having formed-on longitudinal teeth in the central internal area as one functional area and having formed-on ball raceways of the joint internal part as the other functional area.

In the torque transmission unit according to US 2006/0014587, a component having two functional areas for transmitting torque is also provided for each of the three joints contained therein, namely a joint internal part having formed-on longitudinal or spline teeth as one functional area and formed-on ball raceways as the other functional area in each case.

In components of this type, i.e., joint parts, for example, the internal teeth are typically broached and the external teeth are typically produced by pounding, milling, or rolling, and the ball raceways are produced by machining or by a non-chip-forming or chipless technique.

To be able to transmit sufficient torque, at least the ball raceways are hardened. These raceways may be inductively hardened and the remaining area, i.e., also the longitudinal teeth, may be left at the basic hardness. This is advantageous for producing longitudinal teeth, but does not permit the high torque values to be transmitted and the desired service life to be achieved, which are required in many cases.

The inductively hardened ball raceways, for example, must be machined hard because of the distortion occurring upon partial hardening after the hardening to achieve the acquired precision, i.e., hard milling or grinding must be performed.

Another known possibility is to first manufacture the teeth in the soft state, to case-harden the entire part, i.e., having formed-on longitudinal teeth, which results in hardening distortion of both the teeth and also the spline teeth, however, which may only be remedied in the longitudinal teeth with additional great effort, namely by hard broaching in the hard layer using corresponding suitable, but costly special machines and tools, for example.

SUMMARY OF THE INVENTION

The present invention was based on the one hand on the object, in torque transmission devices of the type described above of obtaining high strengths and thus ensuring the transmission of high torques at high precisions, i.e., optimum fit and optimum true running, as well as allowing cost-effective and efficient production, and increasing the service life of assemblies, machines, and devices equipped with components of this type.

Furthermore, the invention relates to torque transmission devices, such as fixed, constant velocity ball joints as opposed track joints having
  a joint external part having external tracks,
  a joint internal part having internal tracks,
  torque-transmitting balls, which are accommodated in track pairs made of external tracks and internal tracks,
  a ball cage having cage windows, in which balls are retained and guided upon joint deflection,
  first external tracks forming first track pairs, in which first balls are retained, with first internal tracks,
  second external tracks forming second track pairs, in which second balls are retained, with second internal tracks,
  the first track pairs and the second track pairs forming ball contact lines having opposing curvatures,
  the external tracks and the internal tracks being delimited by external and internal track bases.

In opposed track joints as are described, for example, in U.S. Pat. No. 6,872,143, the ball raceways and/or running channels are produced in practice by chip removal.

It has already been suggested in U.S. Pat. No. 7,396,284 (=DE 102 09 933) that the external tracks or running channels be formed in a non-chip-forming or chipless manner.

The chip-removing production according to U.S. Pat. No. 6,872,143 is primarily complex, and requires costly machines and long machining times. It also causes significant waste and quality losses in regard to the strength, because the material flow lines are cut through by the machining in a joint internal or external part produced as a preform by forging.

To produce the ball raceways in joints such as those of U.S. Pat. No. 7,396,284 in a chipless or non-chip-forming manner, the prior art describes the possibility, for example, of providing hot-cold or warm-cold processes, a preform being produced within a forging procedure, for example, and the required precision being able to be achieved in a cold calibration process.

Because it is an opposed track joint, differing tools each having opposing ball raceways must already be provided for the production of the preform for such a process. The part precision is also limited by the guiding precision of the machine.

The unavoidable indexing irregularity in the preform also can no longer be remedied in the following machining steps.

A tool having the same irregularities is also required for the calibration process for each of the different ball raceways.

The invention is based on the further object of avoiding these disadvantages and allowing cost-effective and high-quality production of internal and/or external joint parts and thus of fixed, constant velocity joints, in that investment costs for complex and costly machines are avoided, tool wear is reduced, and short machining times are ensured with an optimization of the quality, in particular also in regard to achieving higher torque transmission values. Furthermore, the indexing precision is to be improved and waste-free production, in particular of the ball raceways, is to be made possible, so that machining times, in particular machine run and handling times, are reduced. Moreover, higher carrying capacities are to be achieved and waste is to be avoided.

A solution according to the invention for the first part of the object is achieved in that in a torque transmission unit, which has at least one component having two functional areas for transmitting torque, and one of the functional areas being constructed as a longitudinal profile, in particular as longitudinal teeth, the component as a whole is hardened, but the longitudinal teeth have a lower hardness than the other functional area, but a higher hardness than the base hardness of a joint external or internal part, i.e., the longitudinal teeth have a lower hardness than the ball raceways, but a hardness exceeding the base hardness at least over partial areas of their radial extension.

In particular, hardening with which at least a specific hardening depth results, i.e., the base hardness of the workpiece is increased at least approximately over the height of the teeth, may be advantageous. In an especially advantageous way, a hardening process connected to a diffusion process, such as cost-effective surface hardening in the form of case hardening with subsequent quenching and annealing, may be suitable, which results in a high boundary hardness and—at least for the components discussed here—a lower hardness, the core hardness, i.e., a hardness exceeding the base hardness, in the areas lying within the areas having boundary hardness. Nitration or boration may also be suitable as the hardening process.

It has been found that after at least approximate removal of the areas having boundary hardness, e.g., by a lathing process, in the axial area in which the teeth are formed, this may be performed here using the machines and tools under practically identical conditions as the machining of "soft", unhardened material, i.e., for example, on typical broaching-milling-pounding machines or similar machines.

The second functional areas, i.e., the ball raceways here, may be hard milled and/or ground within the zones of the boundary hardness, as is known. A very special, separate, and independent aspect according to the invention, however, is the creation of a component and the provision of a method for producing such a component, at least one of which is provided in a torque transmission device, which has two different functional areas for transmitting torque which are formed on the component and cause the torque flow by formfitting engagement, one of which is constructed as longitudinal teeth and the other functional area being, for example, the raceways for the balls of a joint, the component, however, in particular one of the functional areas being produced chipless and subsequently hardened, in particular surface-hardened, as described at the beginning, and the component further being distinguished in that the formed-on ball raceways are or were not subject to machining, the ball raceways are thus in installable state after the hardening procedure. In particular for such joints, inventive measures according to the claims and/or measures mentioned in the description may also be applied.

To produce a component of this type, it may be advantageous to subject the component as a whole to surface hardening, in particular a case hardening process, with a subsequent quenching and annealing procedure. The hardest area, i.e., the boundary layer and possibly the transition area, is partially removed, e.g., by chip removal, thus by lathing, for example, in the axial area on which the longitudinal teeth are to be applied, and subsequently the longitudinal teeth are formed in the area brought to the so-called core hardness by the hardening procedure and the subsequent annealing.

These longitudinal teeth may, as already noted, be produced in particular by machining, e.g., by broaching and specifically by "soft broaching", i.e., using normal tools and machines, because they allow the broaching in the core hardness in the same way as with parts which only have the base hardness.

At relatively low cost and without requiring provision of special machines, the invention ensures rapid and efficient production of the longitudinal teeth with sufficiently high hardness and also a correspondingly high strength and, by the possibility of using the so-called soft broaching, the production of longitudinal teeth having higher precision and service life.

The second part of the statement of the object is achieved according to the invention by constructing the joint external part and/or the joint internal part in such a way that the curvatures of the track bases—viewed in their axial course—at least partially deviate from the curvatures of the ball contact lines, the term "lines" also comprising planar areas or combinations of lines and surfaces in the tracks and/or running channels for specific applications. It may be advantageous if the track bases—viewed in the axial direction—run partially at least approximately axially parallel.

In other words, according to the invention the tracks no longer need to be completely deformed over the entire axial distance, but rather only where this is necessary to achieve the ball contact lines.

The joint internal part and/or the joint external part are expediently produced chipless as a preform in a forming tool and provided with at least approximately axially-parallel grooves and projections as pre-formed contours to form the ball contact lines.

The preform may be produced by forging, for example, such as a cold and/or hot forging method or also by other shaping methods, such as sintering.

The ball contact lines of the joint internal part and also the joint external part may be formed by chipless deformation of the projections and/or grooves in a forming tool. This deformation may be performed in a calibration tool, in which the ball raceways and/or contact lines may be geometrically finished-formed, so that they do not need to be machined.

During the production of the ball contact or running lines, along which the balls move upon the deflection of the joint, specific axial areas of the grooves or groove bases and/or notches formed during the production of the preform are expediently not deformed by the calibration tool, so that their structure, which runs at least approximately axially, is partially maintained over the axial course of the finished external and/or internal tracks of the joint external part and/or the joint internal part. This provides the advantage of less deformation work, inter alia.

Furthermore, the invention relates to a method for producing fixed, constant velocity ball joints, which is distinguished in that the tracks of the joint external part and/or joint internal part are produced by reshaping in a preform, i.e., by cold and/or hot reshaping, in that firstly at least approximately axially-parallel notches are produced, the ball raceways are subsequently at least approximately finished geometrically in opposing directions, preferably also by reshaping technology, e.g., in a compression or calibration procedure, without machining being required.

Both the preform and also the opposing course of the ball contact lines may each be produced in one work step and by cold and/or hot reshaping, it being advantageous if the final work procedure is a calibration procedure, so that at least then the ball raceways of the joint part no longer have to be machined (even after a hardening process, e.g., case hardening).

Due to the production initially of a preform having notches running at least approximately parallel in the axial direction and subsequent deformation thereof into ball raceways having the contact and/or running lines for the balls, first of all waste-free production is ensured and thus cost-effective and efficient production and furthermore high indexing precision is achieved, specifically by the tools themselves. The machine itself does not require precise guiding, because the projections and/or grooves of the preform, which extend at least approximately axially-parallel, have been predefined by a single tool and during the finish forming of the ball run lines, the shaping fingers of the tool practically thread themselves.

Particular advantages result, as already noted, if the preform is produced in a single tool, because then the indexing precision of the part itself comes out just as well as the indexing precision of the tool, and this may be very high because the tool is not divided. Furthermore, none of the separate guides for each tool half otherwise necessary for divided tools are required for such an operation.

Also during the calibration operation, which forms the restriction and thus the ball raceways or running lines from the preform, the guiding of the tools relative to one another may be performed by the already existing, precisely divided preform and therefore a machine having special guiding precision is not necessary. In addition, the preform itself does not have to be inserted in a targeted way into the calibration tool, because all 8 tracks, for example, are initially identical, and are produced differently from these identical tracks in the calibration tool.

Furthermore, it may be advantageous to construct and/or produce cage centering faces in the joint external part according to the present invention, as described in U.S. Pat. No. 7,396,284, the entire disclosure of which is incorporated herein by reference. These cage centering faces in the external joint may be constructed in such a way that channels or grooves extending in the axial direction are provided between each of the adjacent first and second cage centering faces, the curvatures of the bases of these channels or grooves at least partially deviating in their axial course from the curvatures of the cage centering faces. These track bases—viewed in the axial direction—may also at least partially extend approximately axially-parallel.

Like the grooves and projections for the ball contact lines or raceways, the cage centering faces may also be produced in a preform in a chipless manner in a forming tool as adjacent radial projections having a groove provided between them which at least runs axially-parallel, the two projections each being provided between two adjacent raceways.

This preform may also be produced by forging, for example. The cage centering faces are advantageously produced in finished form by chipless deformation, such as calibration, of the particular projections adjacent to a groove, the cage centering faces adjacent to one another each running originating from one end, e.g., the drive-side end, in the direction toward the output-side end, approaching the axis of the external joint, and the second cage centering faces running originating from the output-side end in the direction toward the drive-side end and approaching the internal hub axis.

In the same way as described in connection with the raceways, the structures of the grooves and/or the projections of the preform may also be at least partially maintained here.

BRIEF DESCRIPTION OF THE DRAWINGS

The invention will be described in further detail hereinafter with reference to illustrative preferred embodiments shown in the accompanying drawing figures in which:

FIG. 4 shows a section along line IV-IV of FIG. 3;

FIG. 5 shows a section along line V-V of FIG. 3;

FIG. 6 shows a section along line VI-VI of FIG. 3;

FIG. 7 shows a section along line VII-VII of FIG. 3;

FIG. 8 shows a view from the direction of the arrow X of FIG. 4;

FIG. 9 shows a view from the direction of the arrow Y of FIG. 4;

DETAILED DESCRIPTION OF PREFERRED EMBODIMENTS

Figure 1:
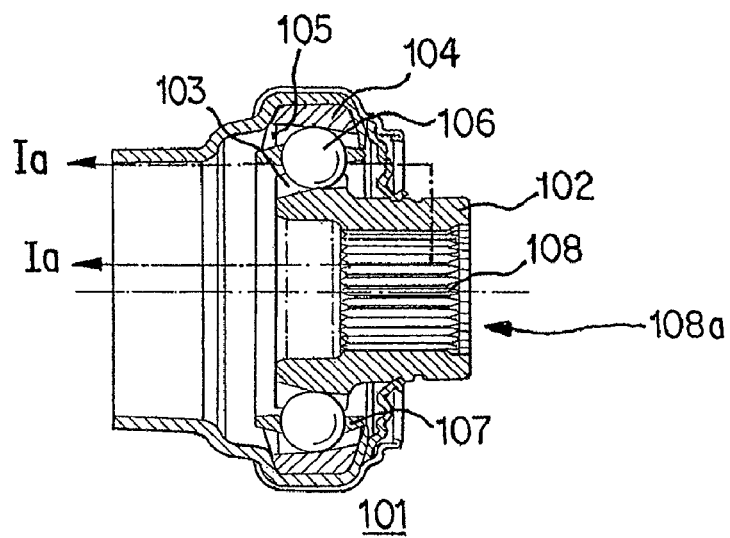
FIG. 1 shows a torque transmission unit according to a feature of the present invention.

The fixed constant velocity joint 101 according to FIG. 1 comprises a joint internal part 102 having ball raceways 103, as well as a joint external part 104 having ball raceways 105 formed thereon in a known way. Balls 106, which transmit the torque between internal and external parts, are provided between the ball raceways 103 and 105 of joint internal and external parts 102 and 104. A cage 107 is used for guiding the balls.

The joint internal part thus has functional areas for torque transmission in the form of the longitudinal teeth 108 on the one hand and in the form of the ball raceways 103 on the other hand.

The joint internal part may advantageously be a forged part having a central recess 108a provided for the formation of the teeth. The ball raceways 103 may be produced, for example, by machining or chiplessly.

The joint internal part is initially subjected as a whole to a surface hardening, in particular a case-hardening process having quenching and subsequent annealing, for example. Before the formation of the teeth 108, the area of greatest hardness of the recess 108a is removed, for example, by machining, such as by lathing.

The internal teeth 108 may then also be produced by machining, for example, by broaching in a very simple and cost-effective work step which ensures high precision. The ball raceways 103 may be ground—before or after the production of the teeth.

In the construction of the teeth 108 according to FIG. 1 or teeth on a pin on the internal joint—or, if the external joint part 16 has teeth, i.e., for example, if external teeth are provided on a pin or internal teeth are provided on a sleeve-shaped attachment—it may be advantageous, as already noted, if the part is case-hardened as a whole before the formation of these teeth. One possibility for the construction of one embodiment of such a joint according to the invention is shown in FIGS. 1a and 1b, which depict an enlarged detail view corresponding to arrows Ia-Ia of FIG. 1.

Figures 1A, 1B:
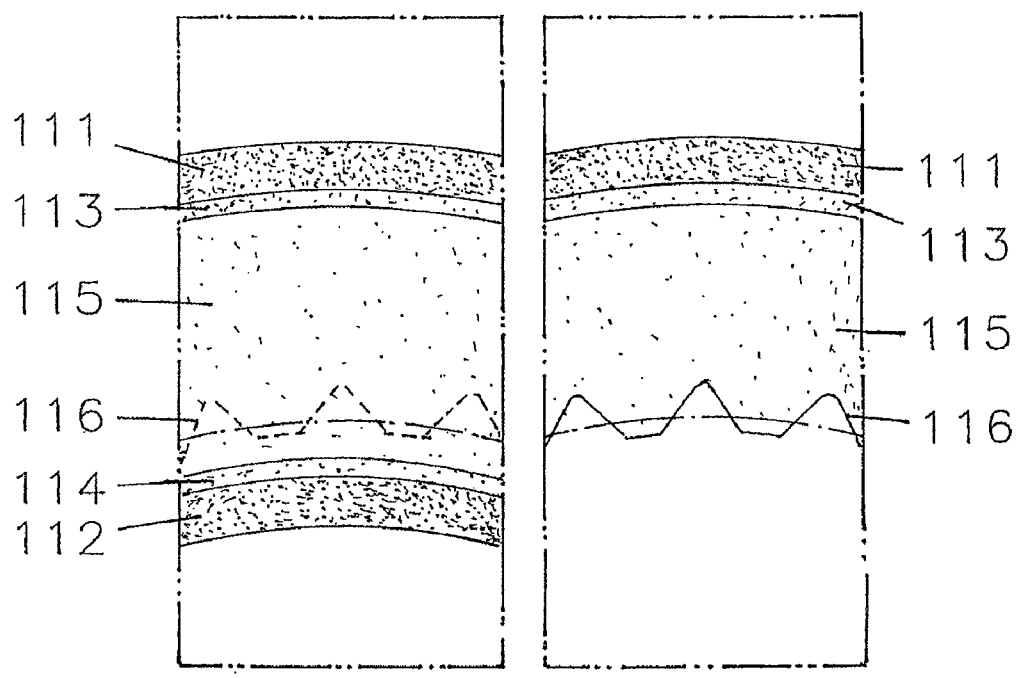
FIGS. 1a and 1b show a section along line Ia-Ia.

FIG. 1a shows the detail in a state after the hardening having the boundary layers 111 and 112 and the transition areas 113 and 114. The area of the core hardness is shown by 115. According to FIG. 1b, at least the area of the highest hardness 112 is removed, e.g., by lathing, and the transition area 114 may be at least partially removed, however, as shown in FIG. 1b, it is entirely removed, so that the teeth 116 lie completely in the area of the core hardness 115.

It is advantageous if the surface hardness of the boundary layers 111 and 112 is between 55 and 64 HRC, preferably in the range from 60±3 HRC. The case hardening depth is expediently between 0.3 and 2 mm (for boundary hardness 550 HV, corresponding to 52.3 HRC), but preferably in the range around 1 mm, here for a diameter of the balls 106, which transmit the torque in the magnitude of approximately 13 mm. The core hardness is expediently in the range from 20 to 50 HRC, preferably from 30 to 40 HRC. The hardness of the teeth—at 350 HV here—is significantly higher than the original base hardness of the starting material, in this case less than 200 HV.

In the same way, joint external parts having external teeth provided on a pin may also be produced according to the invention, the external teeth also being able to be produced in a cost-effective way which ensures high strength and high torque transmission values by machining or reshaping processing, e.g., by pounding, milling, rolling, or the like in an area which was previously hardened and in which the hardest areas were removed before the formation of the teeth. In a joint internal part, a pin may also have external teeth or a joint external part may have internal teeth.

The described features according to the invention are not restricted to the torque transmission devices, which were described in detail above, but rather also extend to other torque transmission devices in which a component has two functional areas for transmitting torques by formfitting engagement with other elements.

Figure 2:
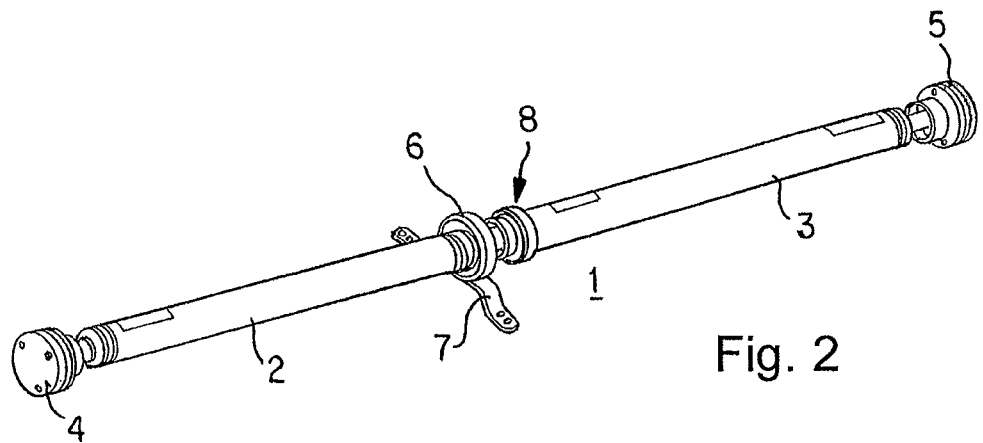
FIG. 2 shows a drive configuration for a motor vehicle having two partial shafts and an approximately centrally situated cardan joint.
Figure 3:
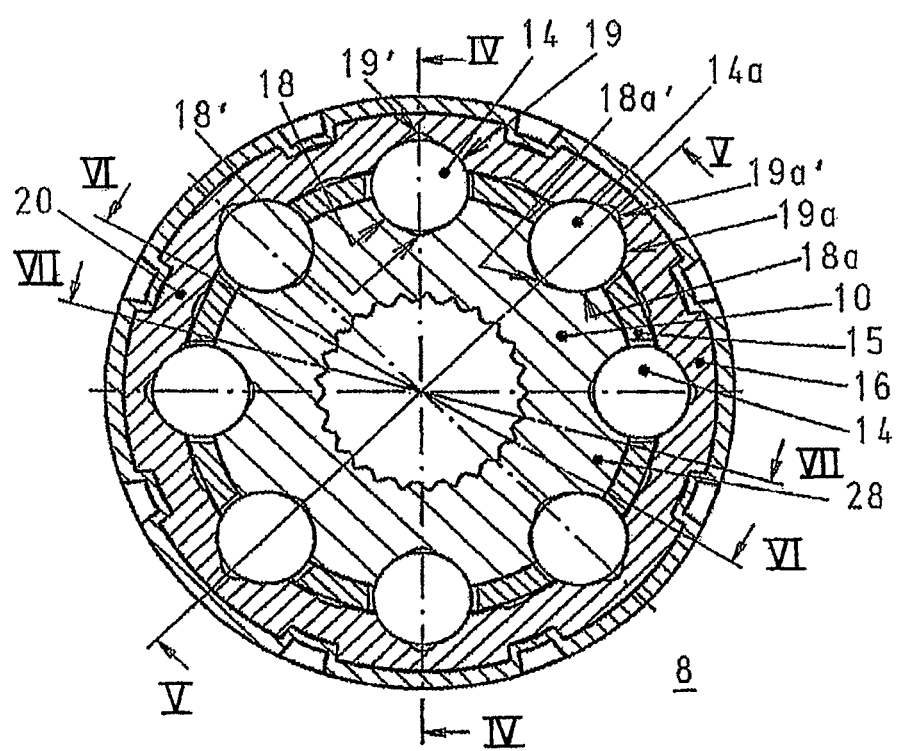
FIG. 3 shows a cross-section through the cardan joint corresponding to a section along line III-III of FIG. 4.

The driveshaft 1 shown in FIG. 2 is constructed here as a longitudinal driveshaft of a motor vehicle and comprises two partial shafts 2 and 3, which carry connection parts 4, 5 on their free ends. These connection parts are constructed as flexible rubber couplings, although cardan joints may also be fastened to the cited partial shafts 2 and 3 in their place, as described in US 2006/014587 or U.S. Pat. No. 6,893,352 (=DE 100 32 853).

The two partial shafts 2 and 3 are connected to one another via a cardan joint 8, which is shown in various sectional illustrations in FIGS. 3 through 9, approximately in the middle of the drive configuration 1. In addition, FIG. 2 shows that the left partial shaft 2 is fastenable to the underbody of a motor vehicle via an intermediate bearing 6 and a retainer 7 situated thereon.

As can be seen in particular from the sections according to FIGS. 3 through 7 and FIG. 10, which show the cardan joint 8 not connected to the partial shafts 2 and 3, the cardan joint primarily comprises an essentially hollow-cylindrical external hub 16, in which an internal hub 10 is situated coaxially. While the first partial shaft 2 may have its external spline teeth inserted into internal spline teeth 11 of the internal hub 10, the connection of the external hub to the second partial shaft 3 is performed in the present exemplary embodiment by a welded bond, for which a welding flange 12 is constructed on a driver housing 9. The external hub 16 is accommodated in the driver housing, and is enclosed in a formfitting way in a receptacle area 17.

First external ball running channels 19 for a first array of balls 14 and further external ball running channels 19a for a second array of balls 14a are provided on the interior side of the external hub 16. Webs 20 are located between them in each case.

First internal ball running channels 18 for the first array of balls 14 and further internal ball running channels 18a for the second array of balls 14a are provided on the exterior side of the internal hub 10. Webs 28 are located between these ball raceways in each case.

The track base of the ball grooves is identified in each case by 18', 19' and 18a' and 19a'.

The internal hub 10 has an internal hub axis I and an external face 24. As can be seen from FIGS. 4, 8, 9 in particular, the first internal running channels 18 and the second internal running channels 18a are situated distributed alternately around the internal axis I, the first internal running channels 18 running here originating from the drive-side end 2a in the direction toward the output-side end 3a, and the internal running channels and their track base 18' moving away from the internal hub axis I; as can be seen from FIGS. 5 and 8, 9 in particular, the second internal running channels 18a run here from the output-side end 3a in the direction toward the drive-side end 2a, these second internal running channels and their track base 18a' moving away from the internal hub axis I here. The first and second internal running channels having their opposing first and second external running channels may also be situated in a sequence other than alternately with one another and may have other courses than described and shown here, e.g., a course first moving away from the corresponding axes and subsequently approaching them again.

The external hub 16 has an external hub axis II and an internal contour, in which first ball running channels or raceways 19 for the first array of balls 14 and second ball running channels or raceways 19a for the second array of balls 14a are situated distributed alternately around the external hub axis II and in each case the first internal running channels 18 are opposite to the first external running channels 19 and the second internal running channels 18a are opposite to the second external running channels 19a and form a pair with them in each case, the first external running channels 19 running originating from the drive-side end 2a in the direction toward the output-side end 3a, and the external running channels 19 and their track base 19' approaching the external hub axis II, and, furthermore, the second external running channels 19a run originating from the output-side end 3a in the direction toward the drive-side end 2a, and the second external running channels 19a having their track base 19a' approach the external hub axis II (FIGS. 4 and 5).

In an annular cage 15 having an at least sectionally spherical external face 26 (see FIGS. 3, 6, and 7 in particular), which is situated between the internal hub 10 and the external hub 16, radial windows 27, in which the balls 14, 14a are guided (see also FIGS. 4, 5) are provided in accordance with the number of the balls 14, 14a and/or running channel pairs 18, 18a, 19, 19a. The cage 15 is centered in the external hub 16 via its external face 26, more precisely via the two centering areas 26a.

Webs 20 are provided between the balls in the internal face of the external hub 16, as already noted. As may be seen in particular in connection with FIGS. 4, 6, 8, and 9, viewed from the drive-side end 2a and around the circumference, these webs have insertion contours 16a primarily provided on both sides of the ball grooves 19 for the balls 14 for the axial insertion of the cage 15 into the external hub 16. The insertion contours 16a originate on the driver side 2a from a diameter which at least approximately corresponds to the external diameter of the cage 15.

Viewed in the axial direction, starting from the drive-side end 2a of the joint, these insertion contours merge after at least approximately half of the axial length into the cage centering faces 16b on the joint external part for the cage and are inclined in the direction toward the cage centering axis III (see FIGS. 4, 6, 8, and 9). The cage centering faces 16b are correspondingly adapted as crowned to the spherically constructed contact faces of the ball cage.

Viewed in the axial direction, originating from the output-side end 3a of the joint, these insertion contours 16c merge after at least approximately half of the axial length of the cage into the second cage centering faces 16b on the external hub for the cage. From there, they run inclined in the direction toward the cage centering axis III. The second cage centering faces 16b are correspondingly adapted as crowned to the spherically constructed contact faces 26b of the ball cage, like the first faces.

As already noted, FIGS. 10-13 show a joint internal part as the unfinished part and finished part R10 and F10 and FIGS. 14-18 show the joint external part as the unfinished part and finished part R16 and F16.

Figure 10:
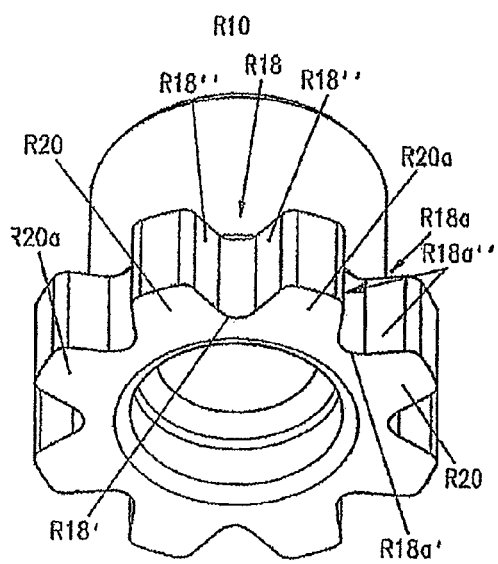
FIGS. 10-13 show a joint internal part as unfinished and finished parts.

The preform R10 according to FIG. 10 is a forged part having four pairs of projections or webs R20, R20a, which are distributed uniformly around the circumference and are constructed at least approximately uniformly, between which grooves or notches R18, R18a having groove bases R18' and R18a', which run at least approximately axially parallel, are provided.

The preform R10 may also be produced, as already noted, using a hot-cold or warm-cold process, for example, or also as a sintered part.

Figure 11:
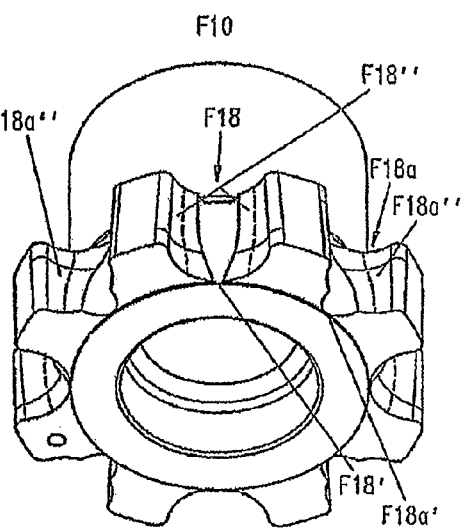
Figure 12:
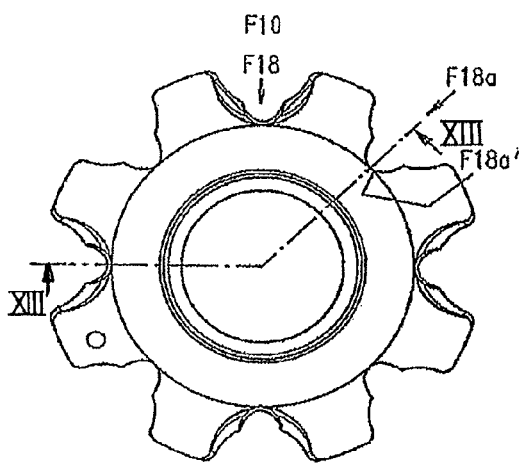
Figure 13:
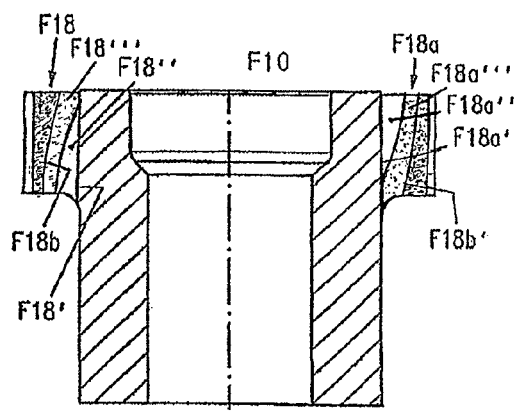

The running channels F18, F18a apparent from FIGS. 11, 12, and 13 are deformed from the projections or webs R20, 20a by calibration in a tool which consists of two tool halves having plungers running in opposite directions to form the opposing running channels F18, F18a, using a cold deformation method, in particular by calibration.

The groove bases R18' and R18a' according to FIG. 10 remain at least partially maintained even after the calibration, as do partial areas F18", F18a" according to FIGS. 11-13 from the lateral flanks R18" and R18a" previously contained in the preform R10. Only the crosshatched sections F18'" and F18a'" were deformed, as can be seen in particular from FIG. 11. The faces F18'" and F18a'" are deformed in such a way that ball running lines or ball contact lines F18b and F18b' arise, along which the balls move upon the deflection of the joint.

Furthermore, it can be seen in particular in connection with FIG. 13 that the ball raceways F18b and F18b' and the remaining areas of the groove bases F18' and F18a' have different curvatures.

Figure 17:
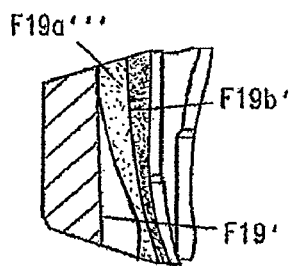
Figure 18:
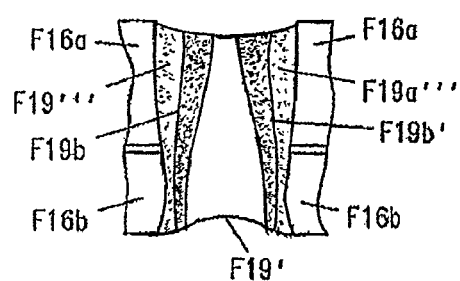
Figure 16:
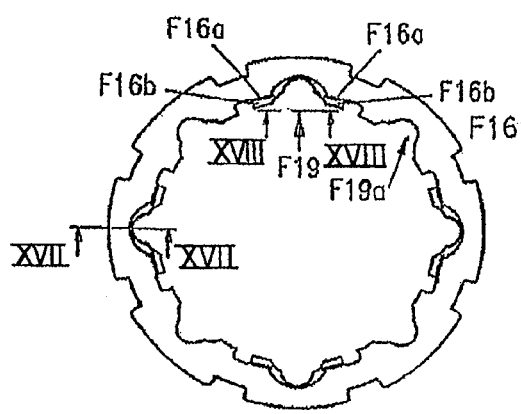

FIGS. 14-18 show unfinished and finished parts of the external joint R19 and F19, FIGS. 17 and 18 showing FIG. 16 along lines A-A and B-B.

Figure 14:
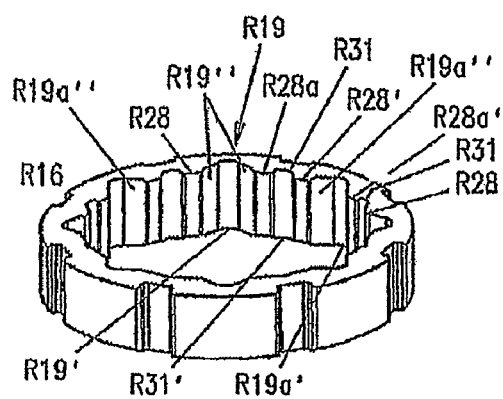
FIGS. 14-18 show a joint external part as unfinished and finished parts.
Figure 15:
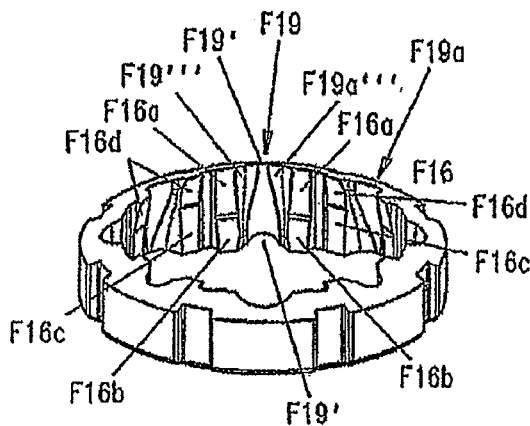

The preform R16 according to FIG. 14 is produced here as a forged part having first and second projections or webs R28, R28a and R28', R28a', which extend radially inward. The projections R28 and R28a, which run at least approximately axially-parallel, are designed as at least approximately mirror-image, like the projections 28' and 28a'.

The projections R28 and R28a each enclose a first groove or notch R19 between them, which runs at least approximately axially-parallel, as the projections R28' and R28a' enclose a second groove or notch R19a between them. The projections R28a and R28' as well as R28a' and R28 each enclose a third groove R31 between them.

The grooves R19 and R19a each have groove bases R19' and R19a' and the grooves R31 each have groove bases R31'. The grooves R19 and R19a also have side flanks R19" and R19a".

The joint external part is produced as a finished part F16 by a calibration procedure. The first and second ball running channels F19 and F19a of FIGS. 15-18 are deformed from the side flanks R19" and R19a" of FIG. 14.

The groove bases R19', R19a' of FIG. 14 are maintained at least approximately over the axial extension thereof as the track bases F19'. Only the crosshatched sections F19'" and F19a'" in FIGS. 17 and 18 are deformed of the side flanks R19" and R19a" and the ball contact lines or ball running areas F19b and F19b' are thus formed.

It is also apparent here that the curvature of the groove bases F19' differs from that of the contact lines F19b and F19b'.

The second channels F19a are produced in the same way as the first running channels F19, but in the opposite direction, i.e., restricted to the channels F19.

On both sides of the groove F19, insertion contours F16a running at least approximately in the axial direction are produced from the first projections R28 and R28a, advantageously by the same calibration procedure in which the contours F19, F19a, F19'", F19a'", F16b, F16b' are generated.

In the further axial course of the insertion contours F16b, the cage centering areas F16b are provided on both sides of each channel F19, a stepped projection or transition area being provided between the contours F16b and F16a.

The cage centering areas F16b and F16d are adapted to the spherical contact faces 26b of the ball cage 15.

In the same way, but with opposing restriction, the cage centering faces F16d and the insertion faces F16c are produced and/or constructed on both sides of the channels F19a.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. A method for producing a component having two functional areas formed thereon for transmitting torque via form-fitting interengagement, wherein one of said functional areas is constructed as longitudinal teeth, said method comprising:
   surface hardening the component as a whole;
   thereafter removing a hard area in an axial area onto which the longitudinal teeth are to be applied, and
   subsequently forming the longitudinal teeth so that the teeth, starting from their tip circle diameter, have a lower hardness than a hardness of the other of said functional areas at least approximately over their radial extension.

2. A method as claimed in claim 1, wherein the hard area is removed by a chip-forming lathing operation, and the teeth are subsequently formed by a machining operation selected from the group consisting of broaching, hammering and milling.

3. A method as claimed in claim 1, wherein the hardening of the component is effected by case-hardening.

4. A method as claimed in claim 1, wherein the component is quenched and annealed.

5. A method as claimed in claim 1, wherein said component having two functional areas for transmitting torque is the inner part of a joint of a cardan shaft, wherein one of said functional areas comprises ball raceways formed on an external area of the inner part of the joint in which balls are accommodated, said balls forming a torque-transmitting joint with ball raceways formed on an internal area of the outer part of the joint of the cardan shaft, and the other functional area comprises teeth connected indirectly or directly to the cardan shaft, said teeth having a lower hardness than the ball raceways.

6. A method as claimed in claim 1, wherein said component is an outer part of a joint of a cardan shaft; wherein one of the functional areas comprises ball raceways formed on an internal area of said joint outer part in which balls are accommodated, said balls forming a torque-transmitting joint with ball raceways formed on an external area of an inner part of the joint of the cardan shaft, and the other functional area comprises teeth connected indirectly or directly to the cardan shaft, said teeth having a lower hardness than the ball raceways.

7. A method as claimed in claim 1, wherein the component is brought to a higher surface hardness prior to formation of the longitudinal teeth by a hardening process involving a diffusion process which produces a diffusion layer.

8. A method as claimed in claim 7, wherein the diffusion layer is at least partially removed by machining in the area of the longitudinal teeth to be formed.

9. A method as claimed in claim 7, wherein the diffusion layer is a carburized layer.

10. A method as claimed in claim 9, wherein the carburized layer is at least partially removed in the area where the longitudinal teeth are to be formed.

11. A method as claimed in claim 7, wherein the longitudinal teeth have core hardness.

12. A method as claimed in claim 11, wherein a carburized boundary layer and at least part of a transition area between the core hardness and the boundary layer are removed in said removing step.

13. A method as claimed in claim 1, wherein said component is a joint external part or a joint internal part of an opposed track constant velocity ball joint, wherein said joint external part has external tracks, or said joint internal part has internal tracks.

14. A method as claimed in claim 13, wherein said constant velocity ball joint further comprises:
   torque-transmitting balls, which are accommodated in track pairs composed of said external tracks and internal tracks, and
   a ball cage having cage windows in which the balls are retained
   wherein:
   first external tracks form first track pairs with first internal tracks, and first balls are retained in said first track pairs;
   second external tracks form second track pairs with second internal tracks, and second balls are retained in said second track pairs;
   said first track pairs and said second track pairs form respective ball contact lines having opposing curvatures;
   the external tracks and the internal tracks are delimited by external and internal track bases, and
   the external and internal track bases have curvatures which at least partially deviate in their axial course from the curvatures of the respective ball contact lines.

15. A method as claimed in claim 14, wherein the track bases as viewed in the axial direction at least partially extend at least approximately axially-parallel.

16. A method as claimed in claim 14, wherein said ball contact lines are formed by a calibration procedure.

17. A method as claimed in claim 14, wherein said component is produced in a forming tool in a chipless manner as a preform having grooves and projections extending at least approximately axially-parallel as pre-formed tracks.

18. A method as claimed in claim 17, wherein the ball contact lines are shaped in a forming tool by chipless deformation of the grooves and the projections.

19. A method as claimed in claim 17, wherein said component is a forged preform.

20. A method as claimed in claim 19, wherein the structure of the grooves and projections of the preform is partially maintained.

* * * * *